(12) United States Patent
Hovland et al.

(10) Patent No.: US 8,051,791 B2
(45) Date of Patent: Nov. 8, 2011

(54) HELICOPTER LANDING PLATFORM HAVING MOTION STABILIZER FOR COMPENSATING SHIP ROLL AND/OR PITCH

(75) Inventors: Vidar Hovland, Hagan (NO); Arne Vatn, Oslo (NO)

(73) Assignee: PGS Geophysical AS, Lysaker (NO)

( * ) Notice: Subject to any disclaimer, the term of this patent is extended or adjusted under 35 U.S.C. 154(b) by 1345 days.

(21) Appl. No.: 11/639,475

(22) Filed: Dec. 15, 2006

(65) Prior Publication Data
US 2010/0224118 A1 Sep. 9, 2010

(51) Int. Cl.
*B63B 35/50* (2006.01)
*B63B 39/00* (2006.01)
*B64F 1/00* (2006.01)
*B64F 1/22* (2006.01)
*E01F 3/00* (2006.01)

(52) U.S. Cl. ............. 114/261; 114/121; 244/114 R

(58) Field of Classification Search ........ 114/121, 114/122, 124, 261; 244/114 R–116
See application file for complete search history.

(56) References Cited

U.S. PATENT DOCUMENTS

| 1,558,567 | A | | 9/1922 | Schein | |
|---|---|---|---|---|---|
| 3,776,044 | A | * | 12/1973 | Syria | 73/514.09 |
| 3,948,467 | A | * | 4/1976 | Krusius | 244/116 |
| 7,040,247 | B2 | * | 5/2006 | Chouery | 114/261 |
| 7,152,547 | B1 | | 12/2006 | Hovland | |
| 7,299,762 | B2 | * | 11/2007 | Chouery | 114/261 |
| 2002/0189116 | A1 | | 12/2002 | Yang et al. | |

FOREIGN PATENT DOCUMENTS

| DE | 3543140 | | 6/1987 |
|---|---|---|---|
| GB | 204696 | | 12/1924 |
| GB | 1477907 | | 6/1977 |
| GB | 2434779 | | 8/2007 |
| JP | 61092990 A | * | 5/1986 |
| JP | 63017194 A | * | 1/1988 |
| JP | 04050093 A | * | 2/1992 |
| JP | 10147287 A | * | 6/1998 |
| JP | 2001130481 A | * | 5/2001 |
| WO | WO 2005/072255 | | 2/2008 |

* cited by examiner

*Primary Examiner* — Ajay Vasudeva

(57) ABSTRACT

A motion compensation system for a helipad on a vessel includes a sensor for measuring a parameter related to at least one or pitch and roll of the vessel. The system includes a first actuator functionally coupled to the helipad to move the helipad translationally with respect to the vessel in response to the measured at least one of pitch and roll of the vessel.

8 Claims, 4 Drawing Sheets

HELICOPTER LANDING PLATFORM HAVING MOTION STABILIZER FOR COMPENSATING SHIP ROLL AND/OR PITCH

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of aircraft access to floating structures. More particularly, the invention relates to helicopter landing pads or platforms associated with floating structures such as seismic survey vessels.

2. Background Art

Floating marine structures known in the art include marine seismic survey vessels. Such vessels are used to tow seismic survey sensors and seismic energy sources in a body of water such as the lake or the ocean. Seismic survey seismic vessels typically include onboard equipment, known collectively as a recording system, that makes records with respect to time of signals generated by the seismic survey sensors, determines geodetic position of the seismic vessel, energy source and sensors at any time, and actuates the source at selected times.

As with any marine seismic vessel, at least some personnel are required to navigate the seismic vessel, and operate the various seismic data acquisition equipment on board the seismic vessel. Typically, seismic survey seismic vessels include a helicopter landing pad to facilitate movement of personnel onto and from the seismic vessel while the vessel is at sea. As a matter of personnel safety, however, there are limits to the amount of seismic vessel movement, other than in the direction of travel of the seismic vessel, for which helicopter landing and takeoff can be safely performed. Such movement has three components known as pitch, roll and heave. Pitch is rotation of the seismic vessel about a horizontal axis transverse to the centerline of the ship. Roll is rotation of the seismic vessel about its centerline. Heave is motion of the ship upwardly and downwardly. Regulatory authorities in some countries, for example, have imposed limits of two degrees maximum pitch and roll for which helicopter landing is permitted. Heave of more than one or two meters may also make it unsafe to land a helicopter on a seismic survey seismic vessel.

U.S. Pat. No. U.S Pat. No. 1,558,567 issued to Schein discloses a system for compensating pitch and/or roll motion of an aircraft landing platform on a floating vessel. U.S. patent application Ser. No. 11/345,013, now U.S Pat. No. 7,152,547, assigned to the assignee of the present invention, discloses a system for compensating an aircraft landing platform on a floating vessel for pitch, roll and heave.

SUMMARY OF THE INVENTION

One aspect of the invention is a motion compensator for a helipad on a vessel. A motion compensator according to this aspect of the invention includes a sensor for measuring a parameter related to at least one or pitch and roll of the vessel. The system includes a first actuator functionally coupled to the helipad to move the helipad translationally with respect to the vessel in response to the measured at least one of pitch and roll of the vessel. A controller operates the actuator in response to the sensor measurements to provide the required compensatory motion.

Another aspect of the invention is a method for compensating motion of a helipad on a vessel for effects of at least one of pitch and roll motion of the vessel. A method according to this aspect of the invention includes measuring a parameter related to at least one or pitch and roll of the vessel, and moving the helipad by an equivalent translational displacement thereof caused by the at least one or pitch and roll motion. The equivalent displacement is determined from the measured parameter.

Other aspects and advantages of the invention will be apparent from the following description and the appended claims.

DETAILED DESCRIPTION

Figure 1:
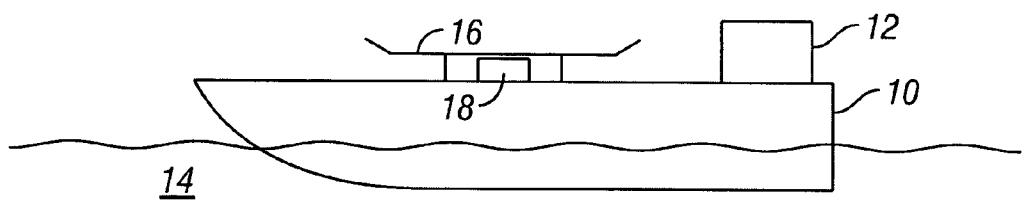
FIG. 1 shows one example of a ship including an aircraft (helicopter) landing platform.

A generalized view of a movable floating structure such as a seismic vessel is shown in FIG. 1 at 10 moving along the surface of a body of water 14, such as a lake or the ocean. A seismic vessel such as shown at 10 will typically include navigation, seismic source control and seismic data recording equipment thereon, and such equipment is generally referred to for convenience as a "recording system" and such is shown at 12 in FIG. 1. The vessel 10 may include an aircraft (helicopter) landing platform, shown generally at 16. For convenience, the aircraft landing platform will be referred to in this description as a "helipad." The helipad 16 may be movably supported on the vessel 10 by a motion compensator system 18. The motion compensator system 18 will be explained in more detail below with reference to FIGS. 3, 4 and 5.

Figure 2:
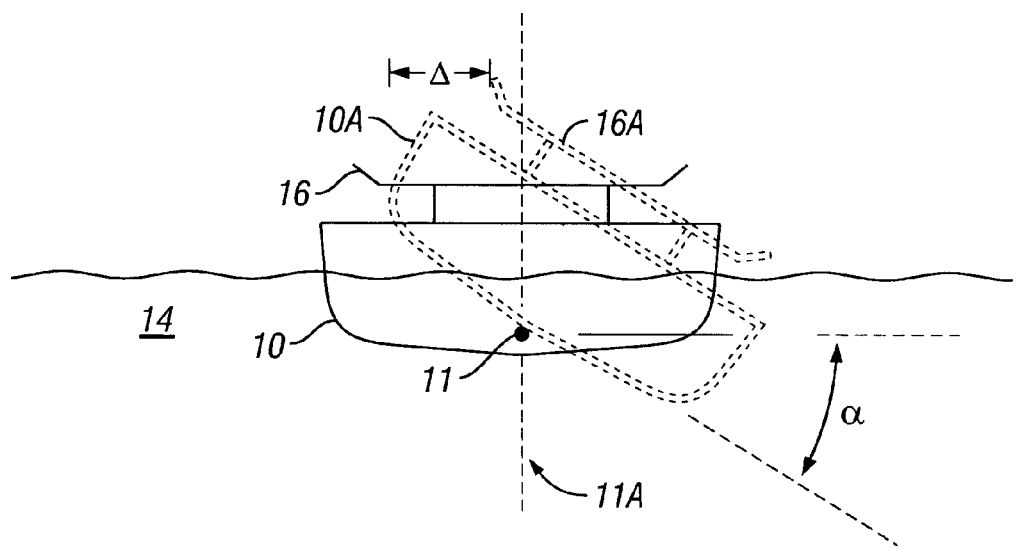
FIG. 2 shows an aft end view of the ship in FIG. 1 to illustrate equivalent lateral displacement of the landing platform when the ship is subject to roll.

As explained in the Background section herein, and referring to FIG. 2, which is an aft end view of the vessel 10 less the recording system (12 in FIG. 1), certain types of motion of the vessel 10 may be characterized as rotation of the vessel about an axis of the vessel. Such motion is frequently induced by the action of waves in the body of water 14. In the present description with reference to FIG. 2, the motion described will be the "roll" of the vessel 10, which as previously explained is rotation of the vessel 10 about a longitudinal axis thereof. FIG. 2 shows a solid line illustration of the vessel 10 with the helipad 16 thereon and a dashed line illustration of the vessel 10A and the helipad 16A thereon. The solid line illustration of the vessel 10 and the helipad 16 represents the orientation of the vessel 10 when it is gravitationally substantially vertical, as would be essentially the case in the absence of any wave motion in the water 14. Such is also the case at certain times as the vessel 10 rolls from side to side about a roll axis 11 in the presence of wave motion transverse to the vessel 10. The dashed line illustration of the vessel 10A and helipad 16A represents a possible orientation of the vessel 10A about the roll axis 11 when the vessel 10A is moved by wave action.

In FIG. 2, a "rolled" orientation of the vessel 10A shown in the dashed line illustration subtends an angle (the "roll angle"), shown at a, with respect to the vertical orientation of the vessel 10 shown in the solid line illustration. The roll angle α and the rotated illustration of the vessel 10A about the roll axis 11 are highly exaggerated in FIG. 2 for the purpose of explaining the principle of the invention. It will also be appreciated that the position of the roll axis 11 with respect to the vessel 10 as illustrated in FIG. 2 is also exaggeratedly low on the vessel 10 for purposes of clear explanation. Ordinarily, the roll axis 11 will intersect the center of gravity (not shown) of the vessel, and the roll axis would ordinarily be designed to be as high on the vessel as practical consistent with its intended use and structure so as to be flotationally stable in the water 14.

Because the helipad 16 is located at some distance from the roll axis 11, when the vessel 10 rolls about the roll axis 11, the equivalent lateral (side to side in FIG. 2) position of the helipad 16A is displaced with respect to a vertical reference line 11A passing through the roll axis 11. During movement of the vessel 10 along the surface of the water 14, the vessel 10 may be considered to move in a substantially straight line parallel to the roll axis 11 (neglecting for purposes of this description any deviation of the vessel 10 from a straight course). The vertical reference line 11A also moves essentially along the same straight line as the motion of the vessel 10. When the vessel rolls, however, the equivalent lateral position of the helipad 16A is displaced with respect to the reference line 11A as shown by Δ in FIG. 2, and such displacement can be observed by the apparent different position with respect to the reference line 11A of the left hand edge of the helipad 16 when the vessel 10 is vertical, and the same left hand edge of the helipad 16A when the vessel 10A is "rolled." Some embodiments of a motion compensator system according to the invention are intended to keep the helipad 16A at a constant equivalent lateral position with respect to the vertical reference line 11A. The amount of the lateral displacement Δ may be approximated by the expression:

$$\Delta = r \sin \alpha \quad (1)$$

wherein r represents the distance between the roll axis 11 and the helipad 16, and α represents the roll angle. It will be appreciated that because the helipad 16 has a finite, non-zero lateral extent and is substantially planar, the actual roll displacement at each point on the surface of the helipad 16 will be different because the distance r at each such point on the helipad is different. For purposes of implementing the invention, a single approximation of the displacement based on equation (1) above for any one selected position on the surface of the helipad is believed to be sufficient. It will also be appreciated that the helipad 16 will undergo a certain amount of vertical displacement at any value of roll angle. The vertical displacement H may be estimated by the expression:

$$H = r \cos \alpha \quad (2)$$

However, for angles up to ten degrees, the actual vertical will be only about 1.5% of the distance r, as contrasted with a lateral displacement of about 17 percent of the value of r at the same roll angle. As will be appreciated by those skilled in the art, the roll angle for which aircraft may be safely landed on the helipad 16 will typically be less than ten degrees. Accordingly, the value of vertical displacement will typically be very small and may be safely ignored in some embodiments.

In various embodiments of a motion compensator system, an actuator moves the helipad translationally with respect to the vessel by an amount that offsets the equivalent translational motion caused by roll (or pitch) of the vessel. The equivalent translational motion may be estimated as explained above with reference to equation (1). "Translational" movement for purposes of this invention is intended to mean substantially parallel to the deck surface of the vessel 10, or lacking such a deck surface, essentially perpendicularly to the vertical centerline (not shown) of the vessel 10.

Figure 3:
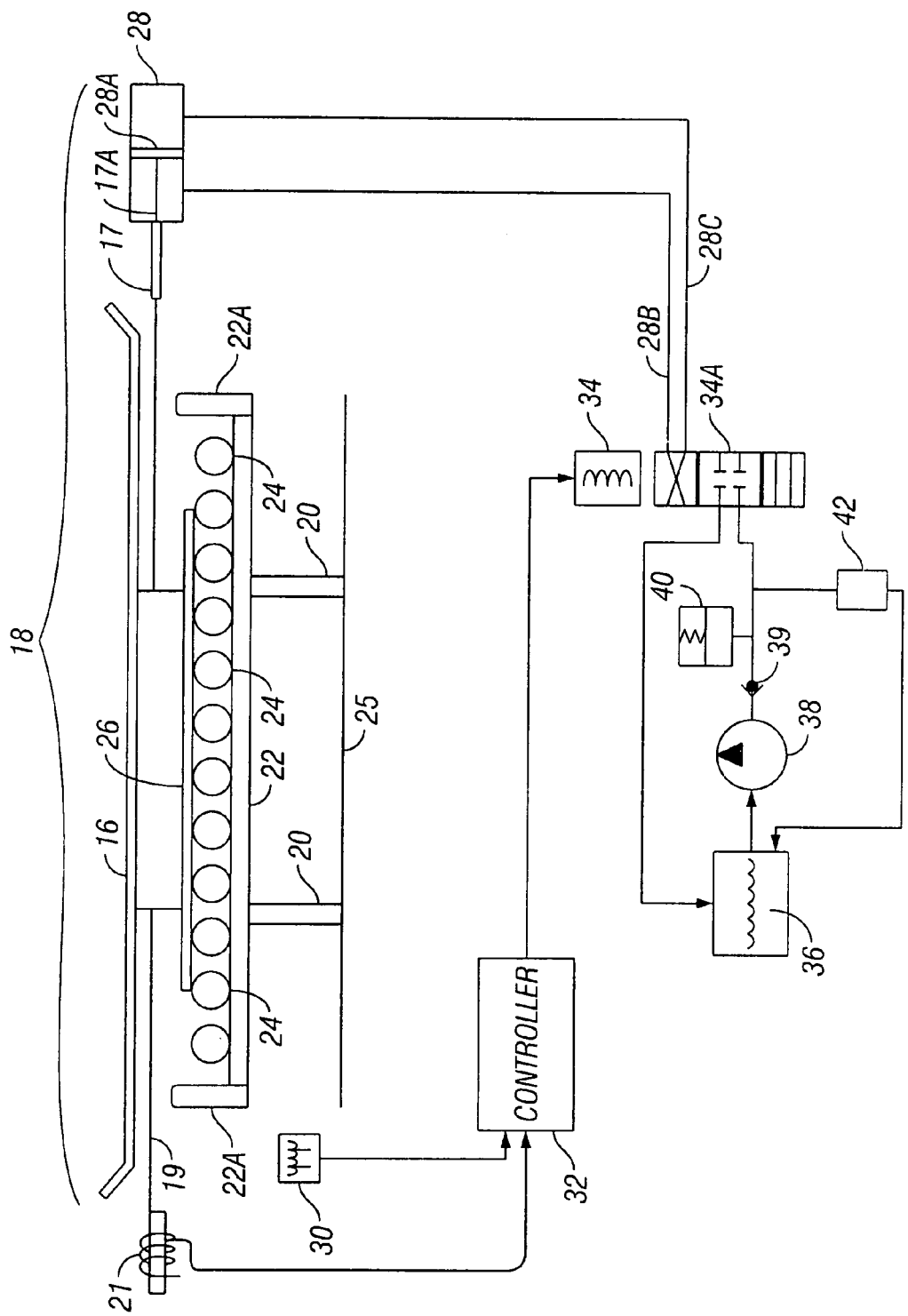
FIG. 3 shows one embodiment of a roll motion compensation system according to the invention.

One embodiment of a motion compensator system will now be explained with reference to FIG. 3. The view in FIG. 3 is from the aft end or the fore end of the vessel, and shows a motion compensation system intended to adjust the helipad position for vessel roll. The system 18 provides that the helipad 16 is movable translationally relative to the deck 25 of the vessel (10 in FIG. 1) in at least one direction. In the present embodiment such direction may be transverse to the longitudinal axis of the vessel (10 in FIG. 1) because the present embodiment is intended to provide compensation for roll of the vessel (10 in FIG. 1). Movability of the helipad 16 in the present embodiment may be provided by a roller guide rail 22 supported by columns 20 coupled to the deck 25 of the vessel (10 in FIG. 1). The roller guide rail 22 supports a plurality of wheels or rollers 24 arranged to support a helipad roller guide 26 such that the roller guide 26 can move from side to side of the roller guide rail 22 by rolling action of the rollers 24. The helipad 16 is coupled to the helipad roller guide 26 and thus is free to move from side to side therewith, the motion limited in extent by end stops 22A in the roller guide rail 22.

The helipad 16 may be caused to move from side to side by an actuator. In the present embodiment, the actuator may include an actuator link 17 to couple the actuator to the helipad 16. The actuator link 17 may be coupled to a ram 17A of an hydraulic cylinder 28 and piston 28A assembly. Hydraulic fluid under pressure may be applied to one side of the piston 28A to cause it to move outwardly from the cylinder 28 to extend the ram 17A and move the helipad 16 in one direction. Hydraulic fluid under pressure may be applied to the other side of the piston 28A to cause it to move inwardly into the cylinder 28 to retract the ram 17A and thus cause the helipad 16 to move in the other direction.

Application of the hydraulic fluid under pressure to the cylinder 28 on either side of the piston 28A may be effected by an hydraulic control system. Such hydraulic control system can include a reservoir 36 that stores a quantity of hydraulic fluid such as oil. The hydraulic fluid is pumped from the reservoir 36 by an hydraulic pump 38 such as a gerotor pump, which may be rotated by an electric motor (not shown) or other prime mover. The discharge of the pump 38 passes through a check valve 39 to an accumulator 40, which maintains hydraulic fluid pressure in the actuator 40 when the pump 38 is stopped. Excess fluid pressure generated by the pump 38 may be vented to the reservoir 36 by a safety valve or pressure relief valve 42 of any type known in the art. Output of the accumulator 40 may be coupled to one inlet port of a two-port, three way valve 34A. The other valve inlet port may be vented to the reservoir 36. The three-way valve may be operated by an electric solenoid 34. The solenoid 34 may be operated by a controller 32, which may be a microprocessor based controller including suitable drivers, such as a programmable logic controller ("PLC"). One such PLC is sold under the trademark FANUC-Series One, which is a trademark of General Electric Company, Fairfield Conn. Operation of the controller 32 will be further explained below.

The outlet ports of the three way valve 34A may each be coupled, respectively, to an "extend" line 28C of the cylinder and to a "retract" line 28B of the cylinder 28. When such lines 28C, 28B are charged with hydraulic pressure, such hydraulic pressure is applied to one side or the other, respectively, of the piston 28A, causing extension or retraction of the ram 17A respectively.

In the present embodiment, the roll angle (a in FIG. 2) may be determined by measurements from a sensor 30, which may be an electrolytic bubble level sensor such as one made by Spectron, Inc., Hauppage N.Y. sold under model designation SP5000. Signals from the sensor 30 may be conducted to the controller 32 wherein the roll angle is determined. The roll angle may be used in the controller 32 to determine an amount of translational displacement necessary to apply to the helipad 16 to keep the helipad 16 in a substantially constant position with respect to the reference line (11A in FIG. 2), or expressed alternatively, to determine an amount of displacement necessary to offset the equivalent displacement (Δ in FIG. 2) caused by the roll of the vessel (10 in FIG. 1).

In the present embodiment, the translational position of the helipad 16 may be determined by functionally coupling the helipad 16 to a position sensor 21 (such as by a link 19). One type of position sensor that can be used with the present invention is a linear variable differential transformer ("LVDT"). In the present embodiment, measurement of the roll angle is used, as explained above, in the controller 32 to calculate an effective translational displacement of the helipad 16. The actual position of the helipad 16 is measured by the position sensor 21. The controller 32 operates the solenoid 34 such that the three way valve 34A is moved to the correct position to either retract the ram 17A or extend the ram 17A until the position sensor 21 measurements correspond to the condition that the helipad 16 is in the preferred translational position with respect to the measured roll angle.

It will be appreciated by those skilled in the art that the foregoing embodiment may be arranged to measure and adjust for pitch of the vessel. Pitch is rotation of the vessel about a horizontal axis transverse to the roll axis (11 in FIG. 1). Accordingly, the foregoing embodiment, and other embodiments to be described below, are not limited in application to compensating for roll motion, but may be equally applied to compensation for pitch motion.

Figure 4:
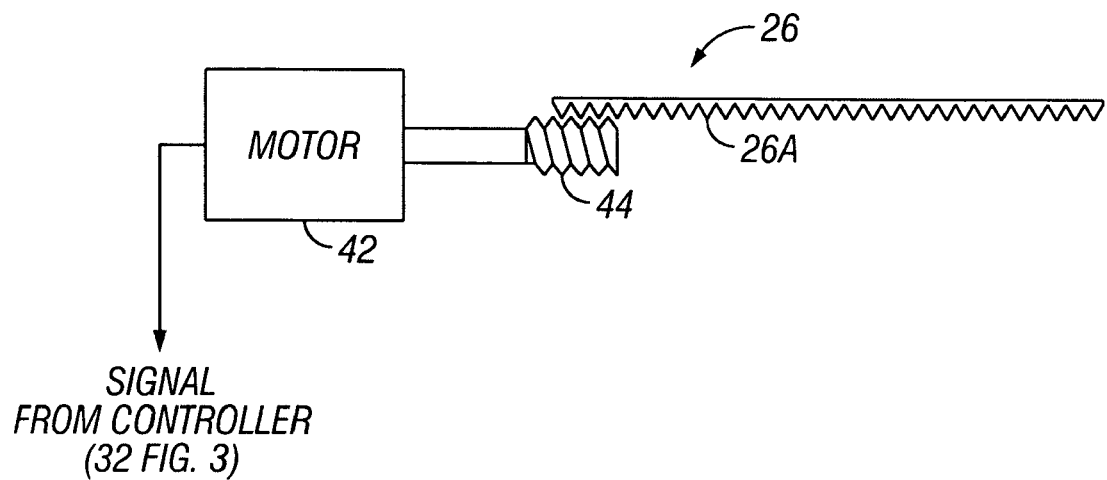
FIG. 4 shows an alternative embodiment of an actuator for the compensation system of FIG. 3.

An alternative embodiment of an actuator will now be explained with reference to FIG. 4. The present embodiment of actuator may include a motor 42, which may be an electric, pneumatic or hydraulic motor, for example. Rotational output of the motor 42 may be coupled to a worm gear 44. The worm gear 44 may be in contact with a toothed rack 26 that forms part of the helipad roller guide 26, or may be indirectly coupled to the rack by a ball nut or similar device that reduces friction. See, for example. U.S. Pat. No. 6,233,828 issued to Reguerio et al. Rotation of the motor 42 is converted by the cooperative action of the worm gear 44 with the teeth on the rack 26A into linear motion of the roller guide 26 (and the helipad 16 in FIG. 3 which is coupled thereto). Control signals to operate the motor 42 may be provided by the controller (32 in FIG. 3). A possible advantage of using a worm gear in connection with a toothed rack is that the lateral position of the helipad (16 in FIG. 3) will be substantially maintained constant when the motor 42 is not rotating.

Figure 5:
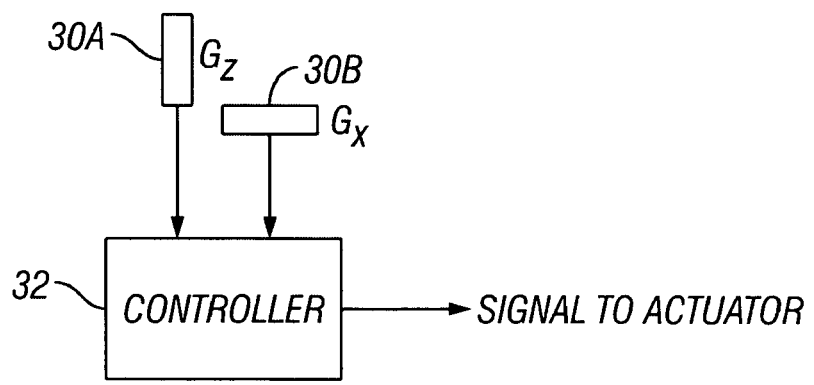
FIG. 5 shows an alternative embodiment of a roll motion measuring element for the system of FIG. 3.

Another embodiment of a sensor to measure a parameter related to the roll angle will be explained with reference to FIG. 5. The sensor in FIG. 5 may include two accelerometers Gz, Gx. The first accelerometer, shown by Gz, may be oriented along a line perpendicular to the longitudinal axis of the vessel (10 in FIG. 2) and thus oriented essentially vertically when the vessel 10 is undisturbed by wave action and is also essentially vertical. The second accelerometer, shown by Gz, may be oriented perpendicular to both the vessel longitudinal axis and to the first accelerometer Gz, and is thus sensitive to a transverse component of Earth's gravity. Measurements of the component of Earth's gravity parallel to each accelerometer Gz, Gx may be conducted to the controller 32 wherein a signal corresponding to the roll angle may be calculated. The calculated roll angle may be used by the controller 32 to operate the actuator according to any of the embodiments explained with reference to FIGS. 3 and 4 to move the helipad so that it maintains its translational position with respect to the reference line (11A in FIG. 2).

As an alternative to measuring a parameter related to the roll angle, in some embodiments only a horizontally oriented accelerometer (Gx in FIG. 5) may be used. Such horizontal accelerometer Gx may be mounted to the helipad (16 in FIG. 2) such that it measures lateral acceleration of the helipad. Acceleration along the sensitive direction of the horizontal accelerometer Gx may be used in such embodiments by the controller 32 to generate a signal to operate the actuator. Lateral acceleration imparted to the vessel by roll motion (or pitch motion) and ultimately to the helipad, will be detected by the accelerometer Gx. The controller 32 may generate a control signal to operate the actuator in response to such detected acceleration. The actuator can be made according to any of the above explained embodiments. The actuator may be operated so that the acceleration measured by the horizontal accelerometer Gx on the helipad is maintained at substantially zero. Horizontal for purposes of this description means essentially parallel to the deck surface of the helipad and substantially along the direction of motion of the helipad to be corrected by the motion compensation system.

Figure 6:
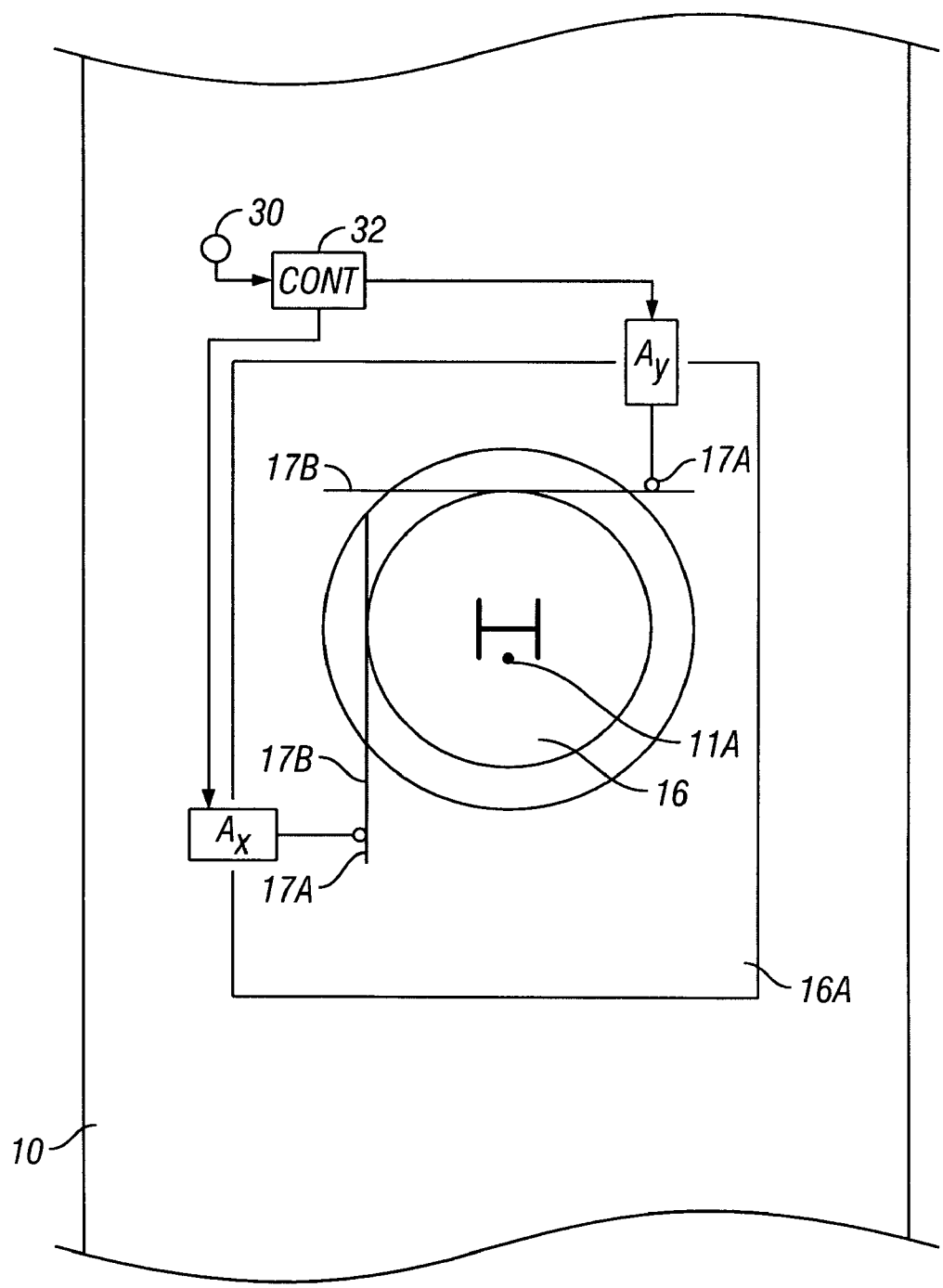
FIG. 6 shows another embodiment that can compensate for motion along two orthogonal directions.

The foregoing embodiments have been explained in terms of moving the helipad (16 in FIG. 3) in one direction to compensate for ship roll. FIG. 6 shows another embodiment that can compensate for motion along two orthogonal directions. The helipad 16 can be disposed on a low friction surface 16A, such as a bed of rollers or other surface that enables two dimensional motion of the helipad 16. Two, substantially orthogonally arranged actuators, Ax, Ay may be functionally coupled to the helipad 16 to move it in either or both of the two directions associated with the actuators Ax, Ay. The actuator links 17A may be coupled to the helipad 16 by slidable couplings 17B that enable the helipad 16 to freely move transversely to each actuator Ax, Ay without changing the distance between each actuator Ax, Ay and the helipad 16. A sensor 30 to measure the angular displacement along the roll axis (11 in FIG. 2) and along the pitch axis may be a two component electrolytic bubble level sensor, substantially as explained with reference to FIG. 3. Such sensor may be affixed to the vessel so that one channel of the sensor is responsive to pitch angle and the other channel is responsive to roll angle of the vessel 10.

Signals corresponding to an amount of pitch angle and roll angle are conducted from the sensor to the controller 32, which in the present embodiment is configured to operate both actuators Ax, Ay, such that the helipad 16 is moved translationally to maintain a substantially constant position in two dimensions. The sensor 30 in the present embodiment may also be accelerometers as explained with reference to FIG. 5 instead of a two channel bubble level sensor. In other embodiments, the controller 32 may be configured to operate the actuators Ax, Ay to maintain lateral acceleration on the helipad 16 in two orthogonal directions (both substantially parallel to the deck of the vessel) at substantially zero.

Methods and systems according to the various aspects of the invention may provide a more stable landing area for helicopters on a vessel, thus increasing the available time to land helicopters on such vessels and increasing the safety of such landings. While the foregoing embodiments of the invention have been described in terms of fixed elevation of the helipad over the deck of the vessel, it should be clearly understood that the present invention may also be used in combination with devices that change the attitude of the helipad. One such device that compensates the attitude of the helipad for pitch, roll and heave of the vessel is described in U.S. patent application Ser. No. 11/345,013 filed on Feb. 1, 2006 now U.S Pat. No.7,152,547, and assigned to the assignee of the present invention. The foregoing '013 application ('547 patent) is incorporated herein by reference for all purposes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A motion compensator for a helipad on a vessel, comprising:
   a first sensor for measuring a parameter related to at least one of pitch and roll of the vessel;
   a first actuator functionally coupled to the helipad to move the helipad translationally with respect to the vessel, wherein the first actuator comprises a motor coupled at its output to a worm gear, the worm gear cooperatively arranged with a rack, the rack functionally coupled to the helipad; and
   a controller in signal communication with the sensor and the first actuator, the controller configured to operate the actuator in response to measurements from the first sensor to offset equivalent translational displacement caused by the at least one of pitch and roll and maintain the helipad in a substantially constant position.

2. The motion compensator of claim 1 wherein the first sensor comprises an electrolytic bubble level sensor.

3. The motion compensator of claim 1 wherein the first sensor comprises an accelerometer.

4. The motion compensator of claim 3 wherein the first sensor is configured to measure translational acceleration of the helipad and the controller is configured to operate the first actuator to maintain a measured acceleration from the accelerometer at substantially zero.

5. The motion compensator of claim 1 further comprising a position sensor functionally coupled to the helipad and in signal communication with the controller, the controller configured to operate the actuator to a selected measured position related to the measured at least one of pitch angle and roll angle.

6. The motion compensator of claim 1 further comprising a second sensor configured to measure at least one of pitch and roll motion in signal communication with the controller, and a second actuator functionally coupled to the helipad and in signal communication with the controller, the second actuator arranged to move the helipad translationally and transversely to translational motion imparted by the first actuator, the motion imparted by the second actuator provided in response to at least one of roll and pitch of the vessel measured by the second sensor.

7. The motion compensator of claim 1 wherein an amount of motion imparted by the first actuator is related to an equivalent translational movement imparted to a selected point on the helipad by the at least one of pitch and roll of the vessel.

8. The motion compensator of claim 7 wherein the equivalent translational movement is estimated by the expression:

$$\Delta = r \sin \alpha$$

wherein r represents the distance between at least one of a pitch axis and a roll axis and the selected point on the helipad, $\Delta$ represents the equivalent translational movement and $\alpha$ represents an angular amount of at least one of pitch and roll.

* * * * *